(12) United States Patent
Ashliman et al.

(10) Patent No.: US 9,114,749 B2
(45) Date of Patent: Aug. 25, 2015

(54) MULTI-PURPOSE UTILITY STRAP

(76) Inventors: Courtney Ashliman, North Logan, UT (US); Jon Jensen, Richmond, UT (US)

(*) Notice: Subject to any disclaimer, the term of this patent is extended or adjusted under 35 U.S.C. 154(b) by 427 days.

(21) Appl. No.: 13/338,684

(22) Filed: Dec. 28, 2011

(65) Prior Publication Data

US 2012/0167351 A1 Jul. 5, 2012

Related U.S. Application Data

(60) Provisional application No. 61/428,059, filed on Dec. 29, 2010.

(51) Int. Cl.
| | |
|---|---|
| *B65D 63/00* | (2006.01) |
| *B65D 63/10* | (2006.01) |
| *B60P 7/06* | (2006.01) |
| *B60P 7/08* | (2006.01) |

(52) U.S. Cl.
CPC ............. *B60P 7/0823* (2013.01); *B60P 7/0861* (2013.01); *Y10T 24/31* (2015.01); *Y10T 24/314* (2015.01); *Y10T 24/316* (2015.01); *Y10T 24/318* (2015.01); *Y10T 24/3485* (2015.01)

(58) Field of Classification Search
CPC ..... B60P 7/0823; B60P 7/0861; Y10T 24/31; Y10T 24/314; Y10T 24/316; Y10T 24/318; Y10T 24/3485

USPC ............................ 24/298, 300, 301, 302, 370
See application file for complete search history.

(56) References Cited

U.S. PATENT DOCUMENTS

| | | | | |
|---|---|---|---|---|
| 496,696 | A | * | 5/1893 | Nash ........................... 211/89.01 |
| 2,372,967 | A | * | 4/1945 | Martin ............................ 410/97 |
| 3,316,600 | A | * | 5/1967 | Latta ............................... 24/370 |
| 3,905,610 | A | * | 9/1975 | Dini ............................... 280/814 |
| 4,769,875 | A | * | 9/1988 | Hartman ......................... 24/300 |
| 4,860,408 | A | * | 8/1989 | Johnson ...................... 24/68 CD |
| 4,986,500 | A | * | 1/1991 | Campbell ......................... 248/53 |
| D317,251 | S | * | 6/1991 | Liang ............................. D8/394 |
| 5,308,101 | A | * | 5/1994 | Monty ......................... 280/480.1 |
| 6,000,591 | A | * | 12/1999 | Alexander ...................... 224/257 |
| 7,805,816 | B1 | * | 10/2010 | Thorne et al. ................... 24/301 |
| 8,201,779 | B2 | * | 6/2012 | Hua et al. ......................... 248/53 |
| 2011/0252604 | A1 | * | 10/2011 | Hansen ........................... 24/301 |

\* cited by examiner

*Primary Examiner* — Robert J Sandy
*Assistant Examiner* — Louis Mercado
(74) *Attorney, Agent, or Firm* — J. Todd Rushton (57) ABSTRACT

A fastening device having a body portion made of an elastomeric material. The fastening device further includes first and second ends configured with retainer rings into which various end attachment can be formed. End attachments are further configured to engage each other, to engage holes formed in the body portion of the fastener, or to engage other objects.

6 Claims, 9 Drawing Sheets

MULTI-PURPOSE UTILITY STRAP

CROSS-REFERENCE TO RELATED APPLICATIONS

This application claims priority to U.S. Provisional Patent Application No. 61/428,059, entitled "Multi-Purpose Utility Strap," filed Dec. 29, 2010, which is incorporated herein by reference.

BACKGROUND OF THE INVENTION

1. The Field of the Invention

The present invention relates generally to fastening and utility strap devices. More specifically, embodiments of the present invention relate to devices of adjustable length used to fasten and secure objects.

2. Related Art

Ropes and cords have long been employed for an incredible variety of uses such as to collect or bind objects; to attach one object to another; to tie objects up; and to hold objects down. The utility of a device that can tie, hold, and fasten in this way is immeasurable. While ropes and cords are still ubiquitously used for such purposes, other devices which are useful for binding, attaching, tying, and fastening objects have also been developed. Such devices offer helpful differences from traditional ropes and cords such as the ability to absorb shock and apply constant tension, and the ability to bind and fasten without the need for tying knots.

Perhaps the best known device of this kind is what is typically referred to as the bungee cord, a cord made of an elasticized material, such as weaved fabric cording material surrounding a rubber core, typically fashioned with hooks at either end. Bungee cords are widely used in travel, camping, home storage, and many other applications. And unlike cords and ropes, bungee cords fasten with hooks that attach to each other, or to parts of the material being bound, rather than requiring knots. Such a configuration provides a quick way to securely fasten objects.

There are, however, certain drawbacks to the traditionally designed bungee cord. For example, bungee cords have a fixed length that must be utilized in the application in order for the bungee to hold securely. If the entire length of the bungee cords device is not used, then the cord will not securely hold or fasten objects. Thus, when using a bungee cord it is necessary to have a bungee cord of a specific length appropriate for the application in which it is being used. Further, the hooked ends of the bungee cord require objects to be fastened by the hooks, an arrangement which will not work for every application.

What is needed are adjustable length elasticized fasteners that provide an easy way to attach and bind objects.

BRIEF SUMMARY OF THE INVENTION

Embodiments of the present invention relate to a multi-purpose fastener fabricated with an elastomeric body portion into which numerous holes are formed. The body portion is made of an elastomeric material that allows the fastener to stretch. The ends of the body portion may be fitted with hooks, buckles, D-rings, wall mount brackets, and a variety of other fastening ends, and/or may be sewn directly onto or into an object for permanent attachment. Hooks, or other fastening ends, may be inserted through the holes located in the body portion to adjust the length of the body portion used in fastening an object, to secure two fasteners together, and so forth.

BRIEF DESCRIPTION OF THE DRAWINGS

The foregoing and other advantages and features of the invention will become apparent upon reading the following detailed description and upon reference to the drawings, in which.

DESCRIPTION OF EXEMPLARY EMBODIMENTS OF THE INVENTION

Embodiments of the present invention provide a multi-purpose fastening device having a body portion made of an elastomeric material into which multiple openings are formed. The body portion is capable of stretching to a length approximately double the initial length of the body portion. Moreover, end pieces for securing the device in a desired position are located at either end of the body portion. Thus, embodiments of the present invention provide a multi-purpose fastening device capable of stretching, which can be used as a fastener of adjustable length and can be secured in a variety of different ways.

Figure 1:
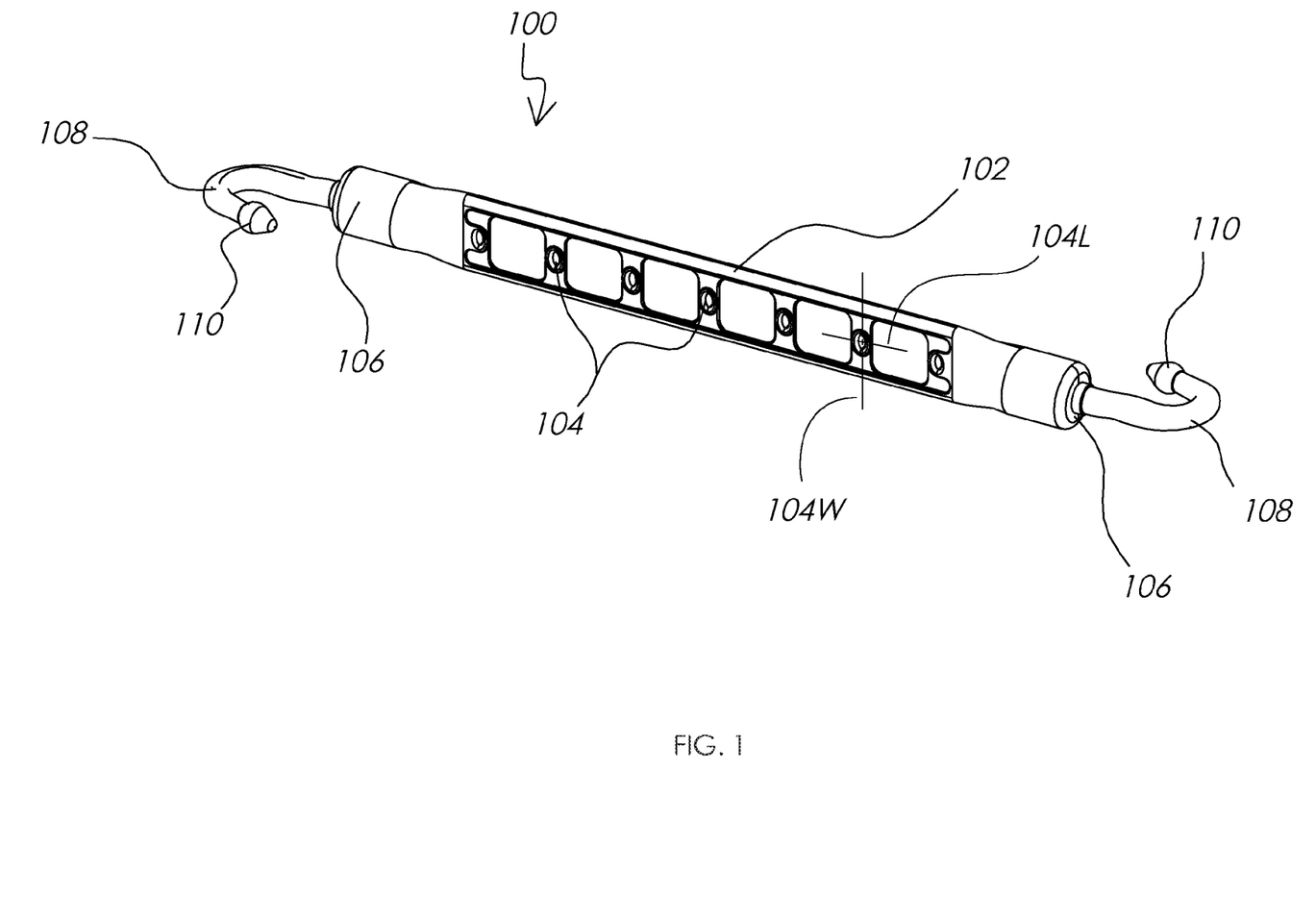
FIG. 1 shows an isometric view of a multi-purpose fastener having hook ends.
Figure 5A:
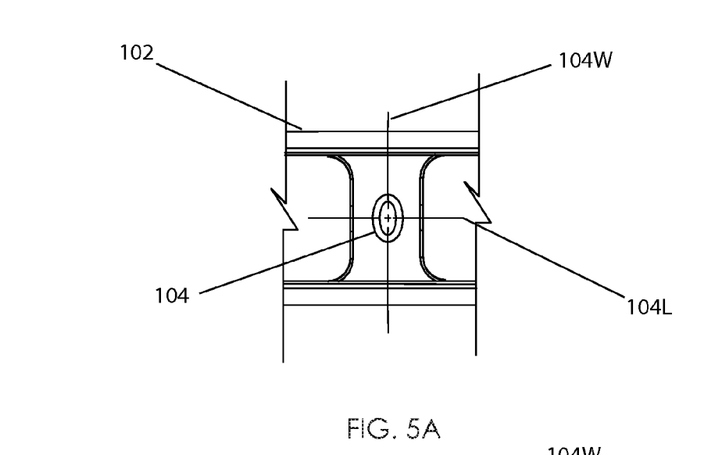
FIG. 5A shows a fastener hole in a relaxed configuration.
Figure 5B:
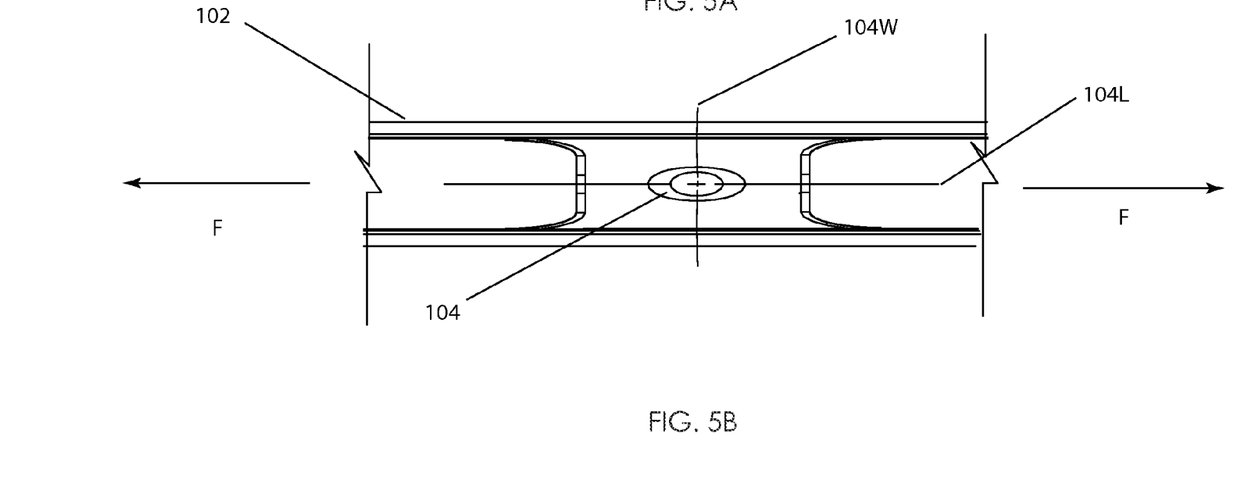
FIG. 5B shows a fastener hole when the fastener is under tension.

With attention now to FIGS. 1 and 5A, a multi-purpose fastening device 100 is shown in a relaxed, non-deformed, configuration. Device 100 includes a body portion 102 into which multiple holes or openings 104 are formed. In one embodiment of the invention, holes of openings 104 have an elliptical shape that incorporates a design which maximizes the strength and elasticity of the body portion 102 at the hole 104; hole 104 having a vertical axis 104W and a horizontal axis 104L, and when hole 104 is in the relaxed configuration, vertical axis 104W is longer than horizontal axis 104L. Moreover, as shown in one embodiment of the invention as seen in FIG. 1, holes 104 may include a surrounding rib, which ribs strengthen the hole. Finally, the elliptical shape of the holes 104 enhances the elasticity of the holes 104. As shown in FIG. 5B, when the body portion 102 of the fastener is stretched, the holes 104 deform such that the elliptical shape is changed so that the longer axis of the ellipsis changes from the vertical axis 104W, or the axis aligned with the width of the body portion 102, to the horizontal axis 104L, or the axis aligned with the length of the body portion 102.

In one embodiment of the invention, body portion 102 is formed of an elastomeric material, such as, for example, a silicone or other compound. In one embodiment of the invention, fabrication of the fastener from such a material provides innumerable benefits. For example, an elastomeric material provides a gripping texture for objects bound with the fastener, a griping texture that is not compromised when the elastomeric material becomes wet. Moreover, an appropriate elastomeric material, such as, for example, silicone, provides many benefits to the design and utility of the fastener because such a material maintains its integrity in extreme temperatures; has a high chemical resistance; is not easily susceptible to disintegration due to sunlight, including UV rays; and so forth.

In addition to being formed of an elastomeric material, body portion 102 is configured in a way to optimize the potential of the body portion to stretch and retract as needed for the application in which the fastening device 100 is used. Body portion 102 further includes ends 106. In one embodiment of the invention, as shown in FIG. 1, hooks 108 are attached at ends 106. It is to be appreciated that hooks 108 represent only one end piece capable of being attached to or formed at ends 106. In other embodiments of the invention, many other configurations of attachments can be formed at ends 106 to perform a variety of different functions and to serve a variety of different purposes. Examples of different embodiments of end pieces 108 are shown in further detail below with reference to FIGS. 2A-2E.

Further, in one embodiment of the invention each of ends 106 includes a retainer ring (see FIG. 3 and accompanying description) over which the elastomeric material is formed. In such a configuration, the hooks 108 are attached at the ends 106 to the retainer rings, which are prevented from being pulled out of the body portion 102 by the configuration of the elastomeric material over the retainer rings. Moreover, retainer rings of this embodiment allow hooks 108 to rotate in ends 106 of the body portion 102.

Finally, in the embodiment shown in FIG. 1, hooks 108 further include tapered ball ends 110. In one embodiment of the invention, the shape of tapered ball ends 110 guides the end into the holes in the body portion 102 of the fastener easily and further prevents the hook end from pulling out of a hole 104.

In operation, device 100 is used as body portion 102 is wrapped around or otherwise configured to secure one or more objects. For example, in some applications device 100 may be used to secure one or more objects to another object, such as, for example, securing camping gear to a motorized vehicle, such as an ATV, or strapping gear to a backpack. To securely hold the objects around which or over which the body portion is placed, hooks 108 can fasten to the objects being secured, or, alternatively, to another object. For example, hooks 108 could attach to camping gear being bound together, or, in another application, hooks 108 could attach to a motorized vehicle onto which camping gear is being secured.

In addition, due to the retainer ring arrangement, discussed in further detail with reference to FIG. 3, the rotating ability of the retainer ring allows the hook or other end piece of the fastener to be rotated so that a fastener that is twisted can be easily straightened out. Thus, the adjustability of the fastener allows a user to fit the fastener directly onto an object, while the rotating ability of the ends of the fastener allows the user to straighten out the fastener.

Moreover, in another embodiment of the invention, hooks 108 can attach to the body portion 102 of the fastening device 100 through one of holes 104. In such an arrangement, tapered ball ends 110 allow the hook to slide into a hole 104 while at the same time preventing the hook 108 from slipping out of hole 104. For example, in one embodiment of the invention, body portion 102 can substantially surround objects to be held together, with one of hooks 108 attaching to an object. Body portion 102 can then be stretched as body portion 102 is wrapped around the objects to be secured. In one embodiment of the invention, body portion 102 can be stretched to a length approximately twice the initial length of the body portion 102. When the objects are secured, a second hook 108 can be fastened to the objects. In another embodiment of the invention, the hooks 108 can be fastened directly to holes 104, thereby adjusting the length of the body portion used to surround objects to be secured.

Stated differently, if camping gear is being secured together in a bundle, fastening device 100 can be used to hold the gear together in the bundle. Body portion 102 is wrapped around the gear. In one embodiment of the invention, hooks 108 can be attached directly to the camping gear to secure the fastening device 100 around the gear. In another embodiment of the invention, hooks 108 could attach to a separate object, such as a vehicle. Finally, in an application where an adjusted length of the fastening device 100 is desired, one or both of hooks 108 may be inserted through an opening 104 to secure the camping gear in a bundle, or to secure the gear to a vehicle. The ability of hooks 108 to rotate about ends 106 of the fastening device 100 enables the hooks to easily engage either objects being bundled, an exterior object, or holes 104 of the body portion 102 no matter how the fastening device 100 is configured in attaching and securing objects.

With attention now to FIGS. 2A-2E, various configurations of, and attachments for, end portions, such as end portions 106 described above, are shown. First, in FIG. 2A, device 200 is shown having a first end 202 configured with a hook 204, and a second end 206 configured with a D-ring 208. Such a configuration provides an arrangement such that objects may be secured when the fastener is attached to itself, as the hook 204 engages the D-ring 208. This configuration may be useful in applications requiring bundling of an object, or bundling of objects together, or other applications involving bundling of objects to a backpack or similar carrier. Moreover, such a configuration is also useful in applications where the fastening device 200 will be stretched a substantial length and secured with hook 204 and D-ring 208 after having been stretched in such a way. Various other uses and configurations suitable for use of hook end 204 and D-ring end 208 are anticipated by embodiments of the present invention. The D-ring 208 shown here represents an example of the versatility encompassed by the configuration of embodiments of the present invention.

Figure 2A:
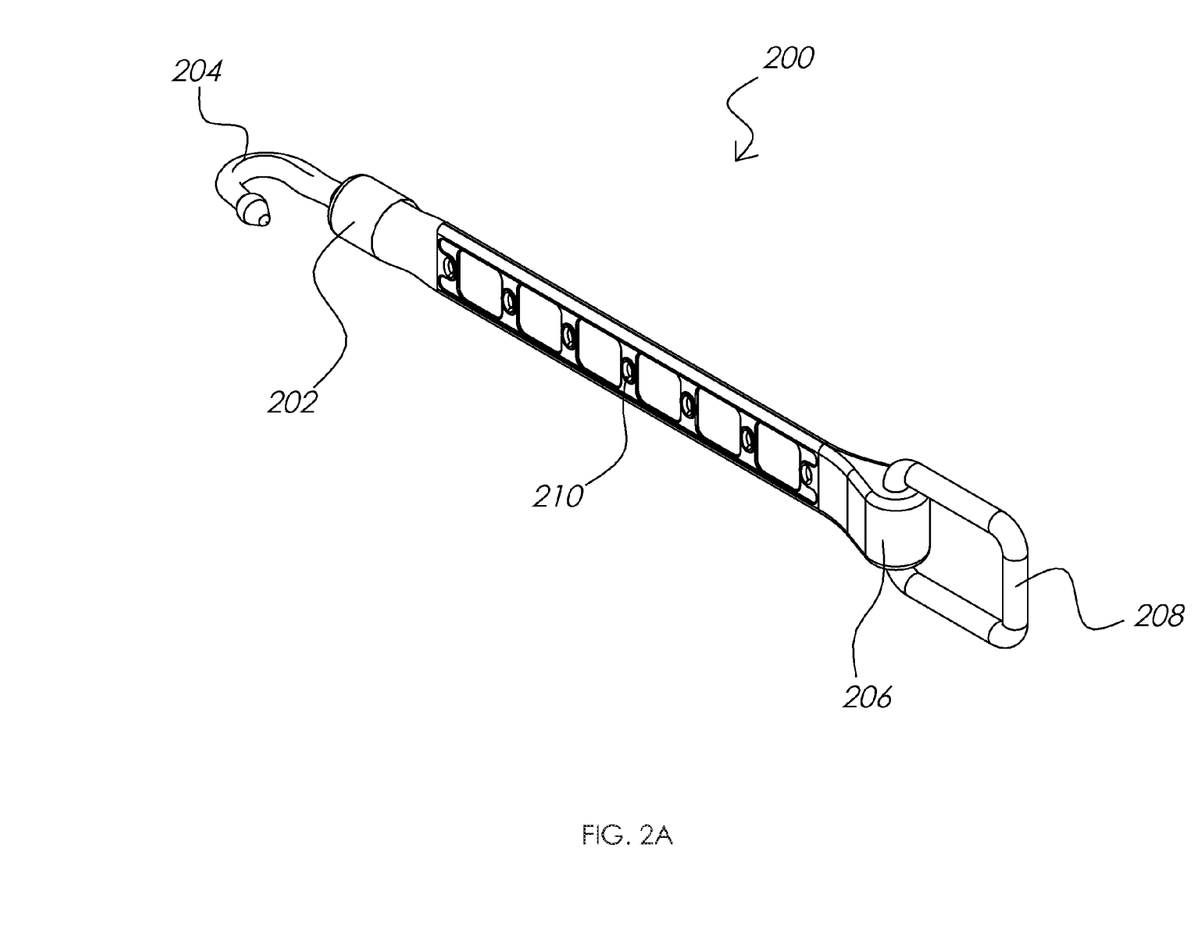
FIG. 2A shows a fastener having one hook end and one D-ring end.
Figure 2B:
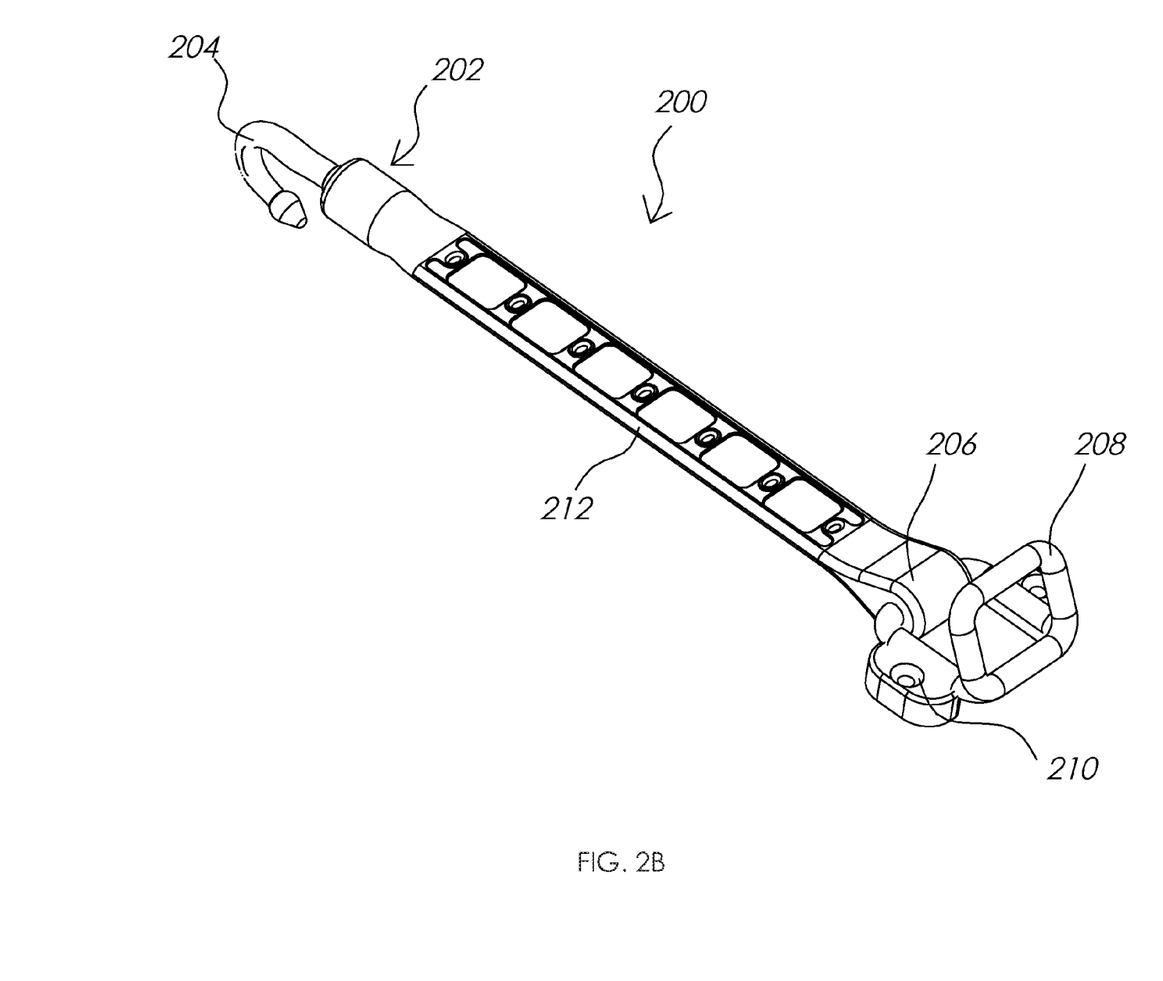
FIG. 2B shows a fastener having one hook and a second end configured with a wall mount bracket and D-ring.

FIG. 2B shows a similar arrangement of fastener 200, with a first end 202 having a hook attachment 204. Second end 206 includes a D-ring 208 and also includes a mounting attachment 210. In such an arrangement fastener 200 may be mounted to a wall or other stationary surface. After the body portion 212 of the fastener is stretched around, or placed around the object or objects to be secured, hook 204 may, in one embodiment of the invention, engage D-ring 208. In another embodiment of the invention, hook 204 may be inserted through an opening 214 of body portion 212. Such an arrangement is particularly useful when a shortened length of fastening device 200 is desired for a specific application. Thus, whether the hook 204 attaches to the D-ring 208 or engages one of the openings 214, the objects held together by body portion 212 will be secured to the wall or other surface to which mounting attachment 204 is attached.

Figure 2C:
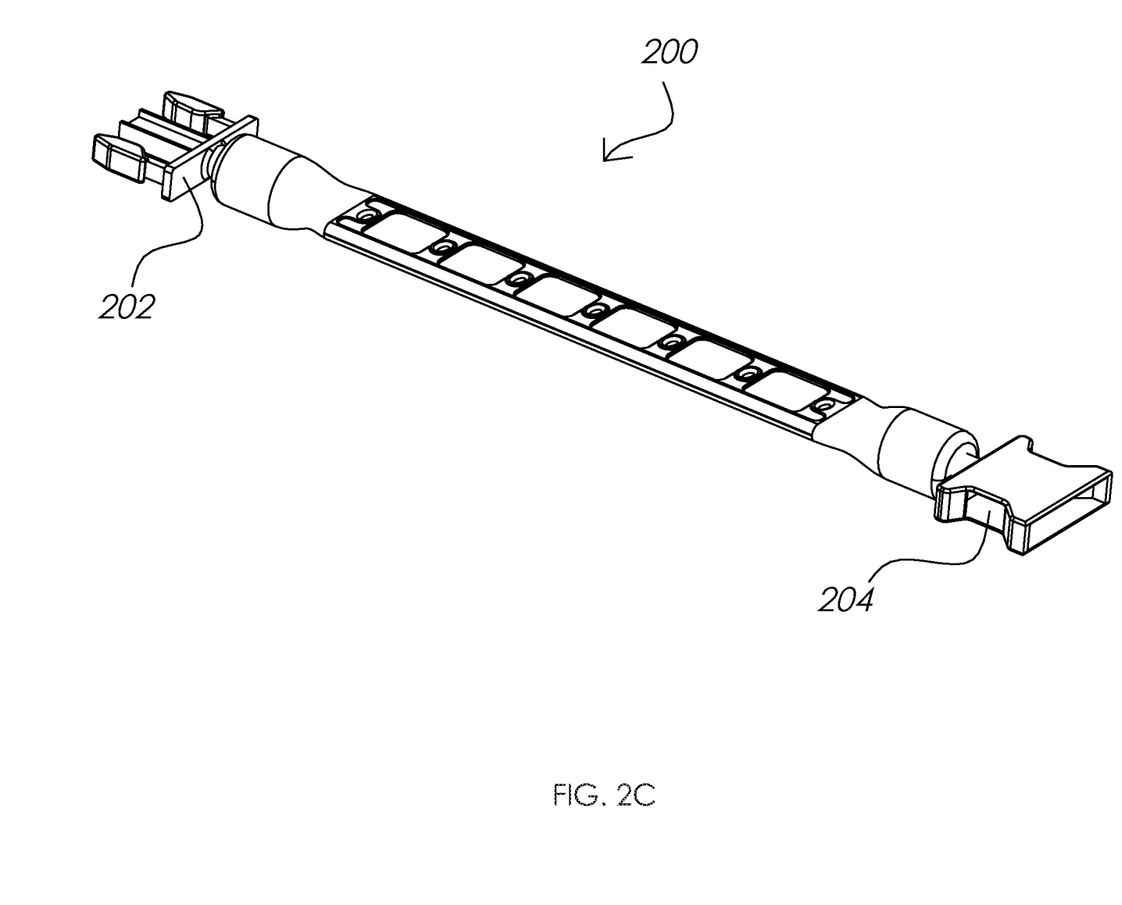
FIG. 2C shows a fastener having buckle ends.

Next, FIG. 2C shows a fastener 200 having ends configured with inserting and receiving pieces 202 and 204, respectively, of a fastener. In the embodiment of the invention shown in FIG. 2C, the fastener is depicted as a buckle, but it is to be appreciated that any other fastener configured with interlocking ends is anticipated by embodiments of the present invention. In this embodiment of the invention, fastener 200 secures objects as it is wrapped around the object and is secured by the buckle elements 202 and 204. In one embodiment of the invention, such an arrangement is particularly useful for securing rolled and bundled items, such as, for example, a sleeping bag, tent, tarp, sleeping pad, and so forth.

Figure 2D:
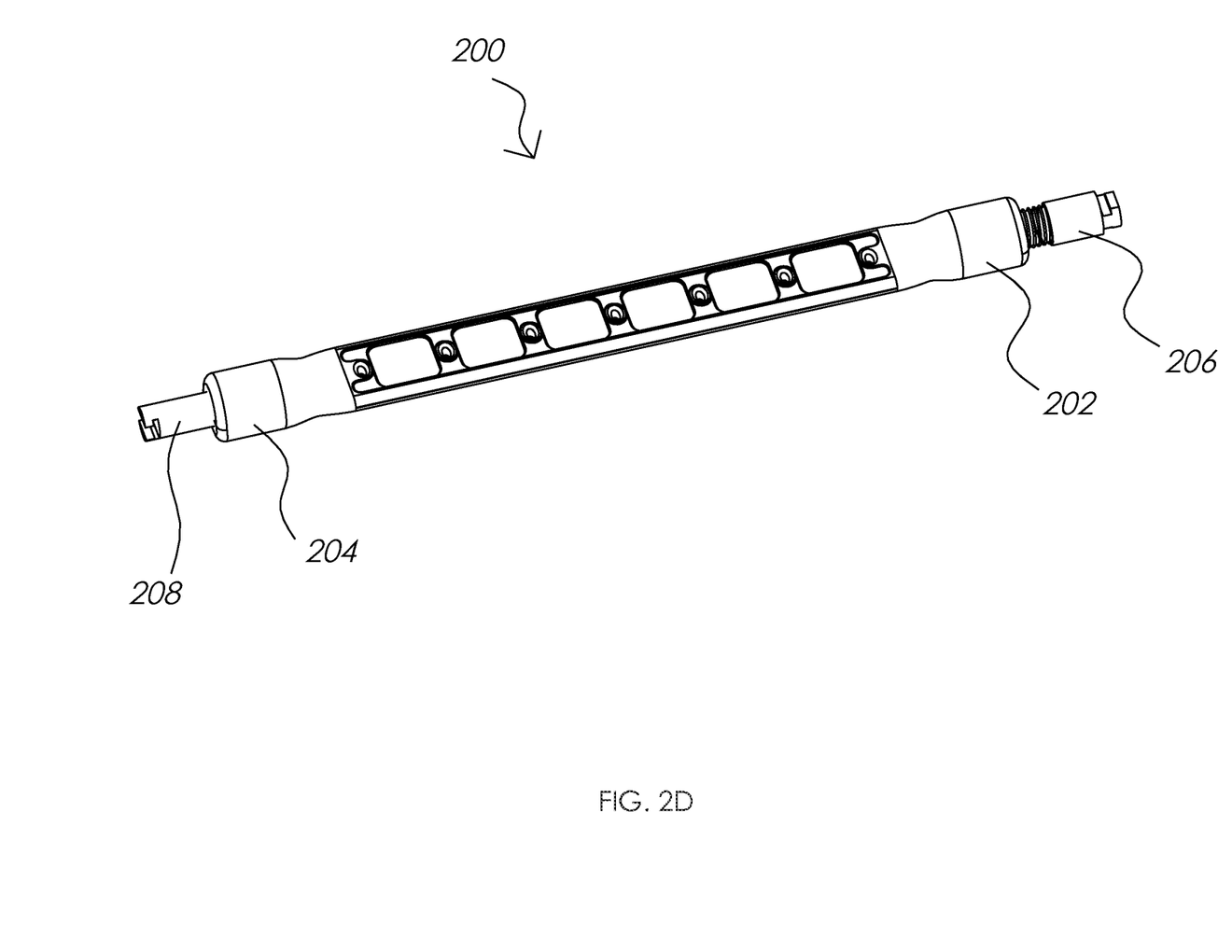
FIG. 2D shows a fastener having cooperating dove tail capture slide ends.

With attention now to FIG. 2D, an embodiment showing fastener 200 including ends 202 and 204 having dove tail capture slide collar ends is shown. In the embodiment shown in FIG. 2D, fastener 200 is stretched and configured in a way to substantially fasten one or more objects, in a manner similar to that described above with reference to FIGS. 1 and 2A-2C. Dove tail capture slide collar ends 206 and 208 then secure the fastener 200 in placed as the ends 206 and 208 are engaged and secured.

Figure 2E:
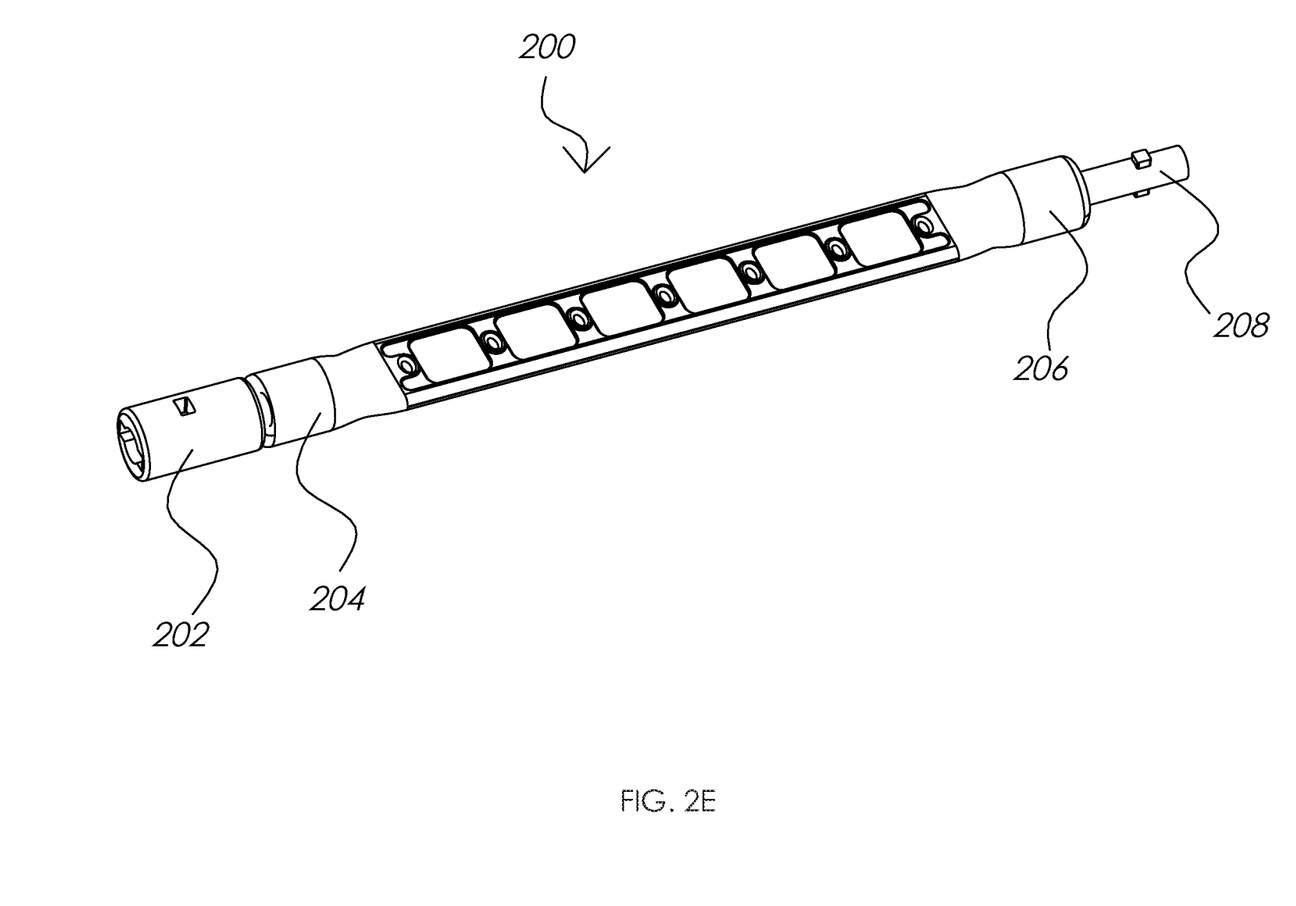
FIG. 2E shows a fastener having twist and lock ends.

Finally, FIG. 2E shows an embodiment for securing ends of fastener 200. In this embodiment, fastener 200 includes ends 202 and 204 having twist and lock attachments 206 and 208. When fastener 200 is stretched and otherwise configured to contain or attach one or more items, twist and lock attachments 206 and 208 are then engaged to secure the items in place. Thus, fastening device 200 can be used in a variety of different applications to secure items and/or to bundle items together in a variety of different ways with any number of different configurations for securing the fastening device and the items, as shown in embodiments of the invention outlined above.

Figure 3:
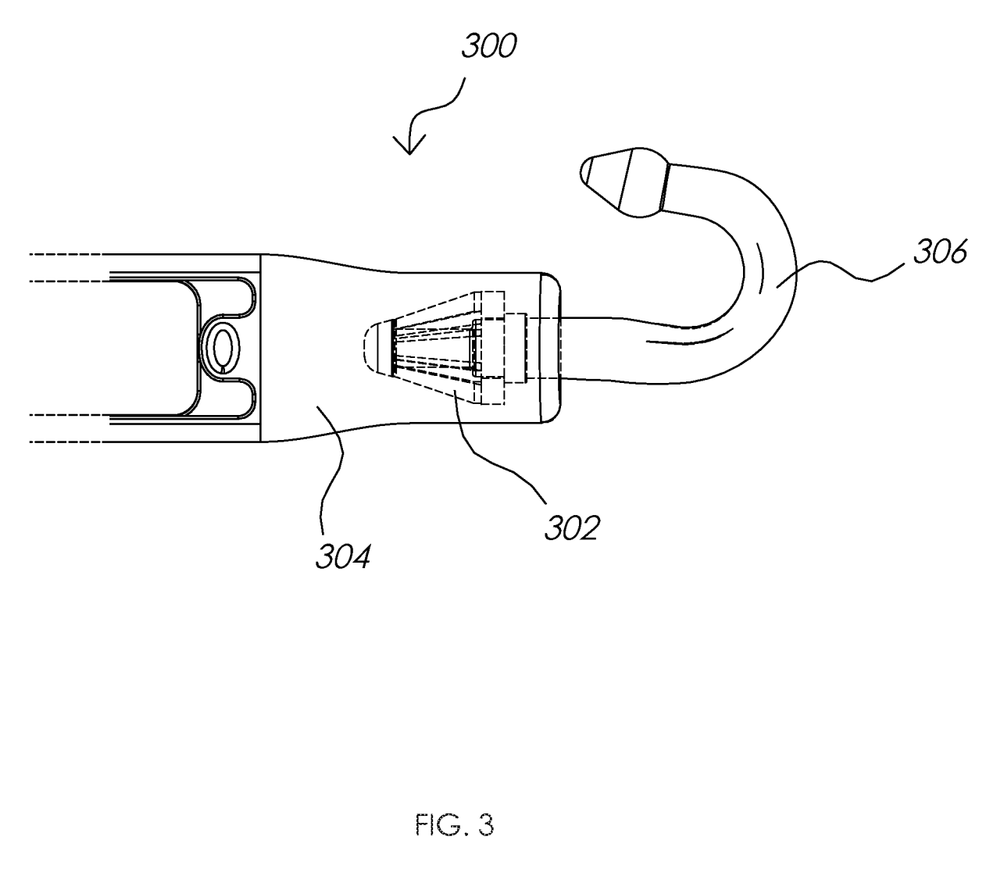
FIG. 3 shows a close-up view of an end of a fastener.

Finally, with attention to FIG. 3, a close-up view of a fastening end 300 is shown. FIG. 3 shows retainer ring 302, shown in shadow, which is enclosed in the elastomeric material of body portion 304. Retainer ring 302 engages and holds hook 306. In operation, retainer ring 302 holds hook 306 allowing hook 306 to rotate within retainer ring 302, but preventing hook 306 from being pulled out of the end of the body portion 304 of the fastening device. Further, in one embodiment of the invention, retainer ring 302 is coated with an adhesive that allows the retainer ring to bond with the elastomeric material of body portion 302. In this embodiment, however, hook 306 is not similarly coated and therefore does not bond with the elastomeric material and therefore can still rotate. Moreover, in one embodiment of the invention, hook 306 does not rotate within retainer ring 302 but is stationary and fixed within the retainer ring.

Figure 4:
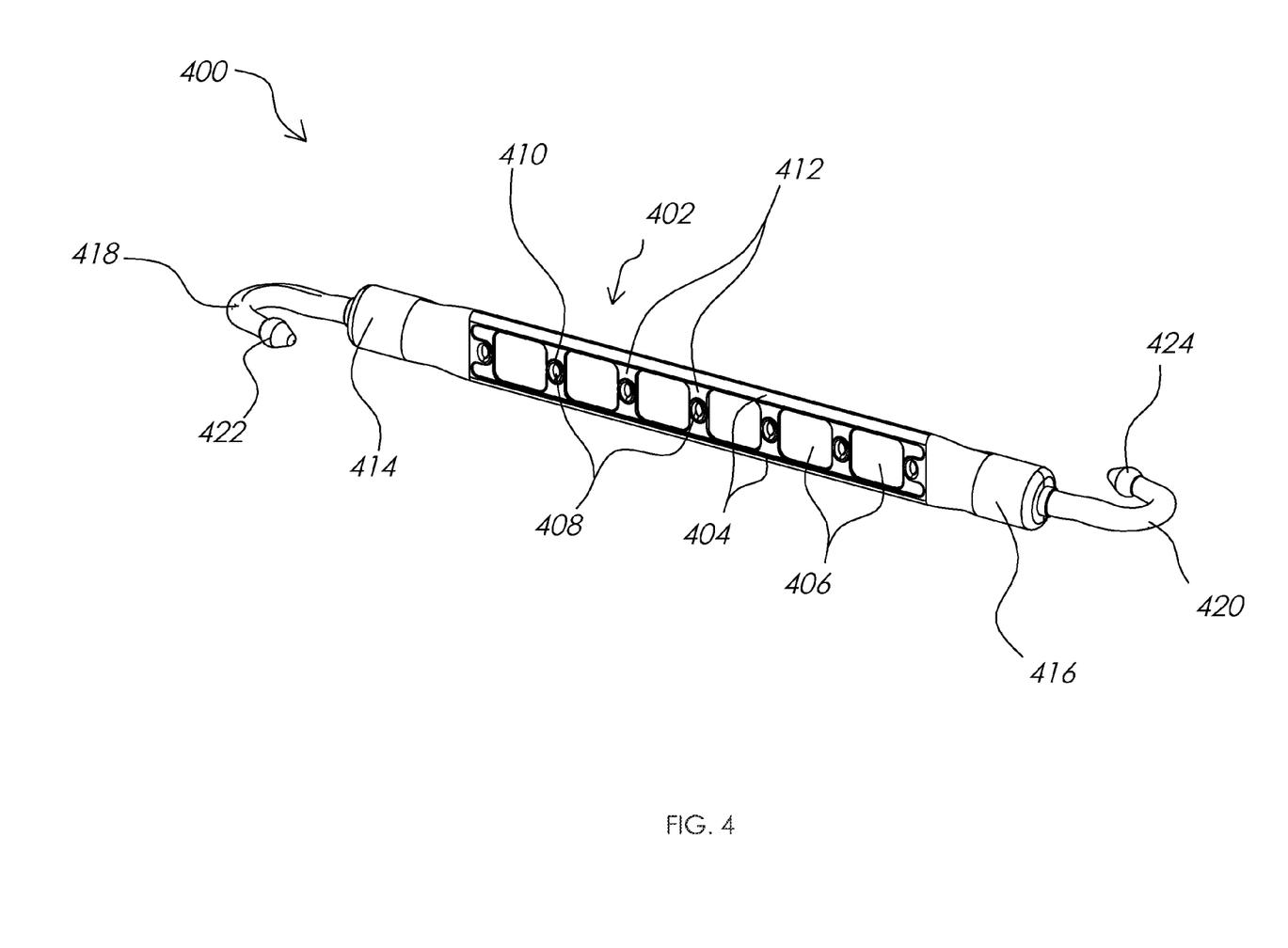
FIG. 4 shows an isometric view of a multi-purpose fastener having hook ends.

With attention now to FIG. 4, a multi-purpose utility strap 400 is shown. Utility strap 400 includes a center portion 402 having a substantially rectangular shape. Center portion 402 includes two thickened edges 404, with a thinner valley portion located between the thickened edges 404. Segments 406, which, in one embodiments of the invention have a substantially square shape, are configured of a thinner material than thickened edges 404. Holes 408 are located between segments 406, with each hole being surrounded by a rib, 410. Moreover, holes 408 are located between segments 406 in slat portions 412. In one embodiment of the invention, slat portions 412 have a thickness somewhat greater than segments 406, but not as great as the thickness of edges 404.

In addition to center portion 402, strap 400 further includes end pieces 414 and 416. In one embodiment of the invention, end pieces 414 and 416 house retainer rings (not shown). Hooks 418 and 420, attached to end pieces 414 and 416 respectively, may be housed within the retainer rings. In one embodiment of the invention the retainer rings allow hooks 418 and 420 to rotate within the end pieces of the strap 400. As shown in FIG. 4, hooks 418 and 420 include bulb-shaped ends 422 and 424, respectively. Ends 422 and 424 are configured to be easily inserted through holes 408, and to be less easily removed from holes 408, due to the bulb shape.

In operation, strap 400, being configured of an elastomeric material, such as, for example, silicone, is deformed and stretched in order to fasten to an item or to otherwise secure objects. The center portion 402 of the strap is stretched, thus deforming holes 408. In one embodiment of the invention, holes 408 have an elliptical shape, each ellipses having a longer axis and a shorter axis. When the center portion 402 is not stretched, the longer axis of the ellipses of the holes 408 is the vertical axis, or the axis running perpendicular to the length of the center portion 402. However, the holes are configured such that when the center portion 402 is stretched, the longer axis of the ellipses becomes the horizontal axis, or the axis running parallel to the length of the center portion 402 of the strap 400.

While the invention may be susceptible to various modifications and alternative forms, specific embodiments have been shown by way of example herein. It should be understood that the invention is not intended to be limited to the particular forms disclosed. Rather, the invention includes all modifications, equivalents, and alternative falling within the reasonable interpretation and scope of the invention.

We claim:

1. A multi-purpose utility strap, comprising:
   a center portion having a substantially rectangular shape with thickened edges and a thinner valley portion located between the edges, wherein segments of the valley portion are substantially square shaped;
   thickened slat portions located between each square shaped segment;
   holes formed within the slat portions, the holes having a substantially elliptical shape having a vertical axis and a horizontal axis, and being surrounded by a rib;
   the vertical axis is longer than the horizontal axis when the center portion is relaxed, and;
   the horizontal axis is longer than the vertical axis when the center portion is stretched and lengthened.

2. The multi-purpose utility strap as recited in claim 1, further comprising:
   end pieces having a retainer ring substantially surrounded by a material forming the center portion, wherein the retainer rings house fastening elements capable of being inserted through the holes.

3. The multi-purpose utility strap as recited in claim 2, further comprising:
   interlocking fastening elements.

4. The multi-purpose utility strap as recited in claim 1, wherein the strap is configured of an elastomeric material.

5. The multi-purpose utility strap as recited in claim 1, wherein the strap is configured substantially of silicone.

6. The multi-purpose utility strap as recited in claim 2, wherein the end pieces are covered in a coating that includes a bonding agent thus bonding the end pieces to an elastomeric portion of the strap.

* * * * *